Fig. I.

Oct. 13, 1964  C. H. CAROTHERS  3,153,128
CIRCUIT INTERRUPTER FOR LIGHTNING ARRESTORS
Filed March 22, 1962  2 Sheets-Sheet 2

United States Patent Office 3,153,128
Patented Oct. 13, 1964

3,153,128
CIRCUIT INTERRUPTER FOR LIGHTNING
ARRESTORS
Charles H. Carothers, Bloomington, Ind., assignor to Westinghouse Electric Corporation, East Pittsburgh, Pa., a corporation of Pennsylvania
Filed Mar. 22, 1962, Ser. No. 181,687
7 Claims. (Cl. 200—115)

This invention relates to circuit interrupters, and while it is not necessarily limited thereto, it is particularly adaptable to circuit interrupters for disconnecting the ground lead of a lightning arrester which may have failed in service.

Lightning arresters of the valve type usually consist of one or more spark gaps which isolate the arrester from the line under normal conditions, but which break down and permit the passage of surge currents when a surge voltage occurs, and one or more blocks of resistance material having valve characteristics, that is, which are substantially non-conducting under normal voltage, but which become capable of carrying large surge currents when a sufficiently high voltage is applied across them. These elements are assembled in series relation in a suitable insulating casing, a sufficient number of gaps and blocks being used to obtain the desired voltage rating.

Such a device is designed to be connected between a power line and ground. When the gap sparks-over in response to abnormal voltage, current flows from the line, through the gap assembly and then through the valve material to ground. The valve material has a high resistance at normal line-to-ground voltage so that the flow of power follow current after a surge has been discharged is limited in magnitude. This power follow current is then completely interrupted in the series gap at the first current zero thus promptly restoring the ordinarily non-conductive ground path to normal. Occasionally, lightning arresters become damaged and unable to interrupt the flow of power follow current to ground. If the lightning arrester is unable to revert to its insulating condition after being discharged by a surge, it puts a ground on the line and causes the operation of circuit breakers, reclosers, fuse cutouts, or other protective equipment unless the lightning arrester is cleared from the circuit. If the arrester stays on the system, in its non-insulating condition, it becomes impossible to reclose the breakers, reclosers, or other devices, and hence the line is locked out of service until the faulted lightning arrester has been found and removed by hand.

To combat this possibility, some types of arresters have been equipped with a so-called "dropout" feature or circuit interrupter. This is usually incorporated in the bottom of the lightning arrester casing and the ground lead is attached to it. In case of failure of an arrester, the resultant heat and pressure causes fracture in a weakened section at the ground end of the arrester permitting the ground lead to dropout, thereby disconnecting the arrester from the circuit.

The present invention is an improvement over the circuit interrupter or dropout described in copending application, Serial No. 41,081 by N. K. Osmundsen and Philip W. Bogner, fined July 6, 1960, and assigned to the Westinghouse Electric Corporation. This type of interrupter is contained in a separate housing secured to the bottom or ground end of the main lightning arrester housing. By the unique construction herein shown and described, the physical size of the arrester is reduced and many parts are eliminated thereby facilitating manufacture and simplifying assembly. This is desirable in order to save space and reduce cost while retaining all of the advantageous features of the interrupter of the above-mentioned application.

The principal object of the present invention is to provide an improved circuit interrupter for a lightning arrester which utilizes fewer parts than previous arresters.

Another object of the invention is to provide an improved circuit interrupter for a lightning arrester which is of smaller physical dimensions than the dimensions of previous interrupters of this type.

Other objects and advantages of the invention will be apparent from the following detailed description, taken in connection with the accompanying drawings, in which.

Briefly, there is shown and described a circuit interrupter or dropout device utilizing a flat type wire coil disposed between a pair of insulating plates. On each side of the pair of insulating plates is disposed a gap electrode. The gap electrodes are spaced apart primarily by the plates and form a spark gap therebetween. The coil and the gap are connected in parallel. The plates are of fiber or other insulating material which evolves gas when exposed to the high temperature of an electric arc. The inductive impedance of the coil to surge current is sufficient to raise the voltage across the parallel spark gap to its sparkover voltage upon occurrence of a surge. The electrical conductor or coil is capable of carrying power follow current without damage. However, in the event of arrester failure and continued flow of fault current, the coil vaporizes. Arcing follows and the arc comes in direct contact with the insulating plates. The heat which is generated during vaporization and arcing of the coil results in the evolution of gas from the insulating plates. The gas is directed by the slot formed between the two insulating plates toward a reduced side wall portion of the circuit interrupter housing thereby fracturing the housing and separating the ground terminal to disconnect the arrester from the circuit.

Figure 1:
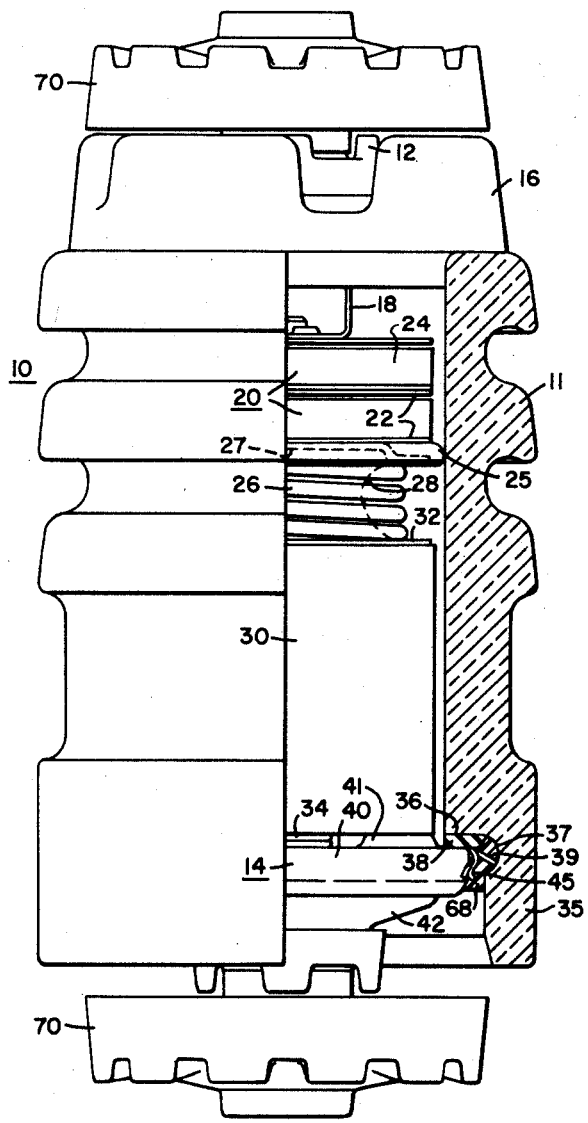
FIGURE 1 is a side elevational view of an arrester incorporating the interrupter of this invention, partly in section.

In FIG. 1 there is shown a valve type lightning arrester 10 which includes a housing 11 of porcelain or any other suitable dielectric material, having a line terminal 12 entering at the top. The housing 11 is hollow and its lower end is closed by the dropout or circuit interrupter assembly 14. It is closed at its upper end by a porcelain cap 16 which is secured thereto in sealing engagement. A U-shaped conducting spacer 18 is in contact at one end with a portion of terminal 12 (not visible) inside the cap 16. At its other end, the spacer 18 engages the upper electrode of the gap assembly 20. The gap assembly includes a plurality of generally disc-shaped electrodes 22 spaced apart by centrally disposed insulating spacer rings 24. The electrodes form a series of spark gaps between them. Any suitable number of electrodes may be employed depending upon the voltage rating of the arrester.

A ring shaped compartmentizer 25, which may be of any suitable flexible insulating material, as for example cork-neoprene, underlies the gap assembly. It is provided to separate the gap assembly from the remainder of the arrester. The periphery of the compartmentizer engages the interior surface of the side walls of the housing 11. This prevents moisture which may be evolved from the resistance blocks from reaching the gap assembly and changing the sparkover characteristics of the gaps. A contact plate 27 underlies the compartmentizer 25 and has a central projection which extends through the central opening of the compartmentizer and engages the lowermost electrode of the gap assembly.

A conducting spring 26 engages the conducting plate 27. The coil spring 26 is maintained in compression and has a shunting strap 28 connecting the top and bottom turns of the spring. As seen in the drawing, the lower end of the spring 26 engages a contact plate 32 on the upper end of a non-linear resistance block or valve block 30 which may be of silicon carbide or any other suitable resistance material which will provide valve characteristics. Two or more valve blocks 30 may be used, if necessary or desirable, disposed in a series column. Each end of the resistance block 30 has a conductive coating which may be of aluminum, zinc, copper or any other suitable conducting material. A compression spring 34 engages the lower end of the non-linear resistance block 30 at its upper end and the closure of the dropout assembly 14 at its lower end. The compression springs 34 and 26 are provided to maintain low resistance at the contacting portions of the internal parts of the arrester. They also provide good mechanical contact. The arrester housing 11 has an enlarged inside diameter extending from its lower end to a point at the lower end of the resistance blocks 30. The enlarged diameter portion forms a skirt 35 and downwardly facing shoulder 36 for seating the dropout device or circuit interrupter 14.

On the inside surface of the skirt 35 adjacent the shoulder 36 is an annular recess 37 which is provided for retaining spring fingers 39 struck out from the cap or cover 40 of the circuit interrupter 14 which will be described hereinafter in greater detail.

Figure 2:
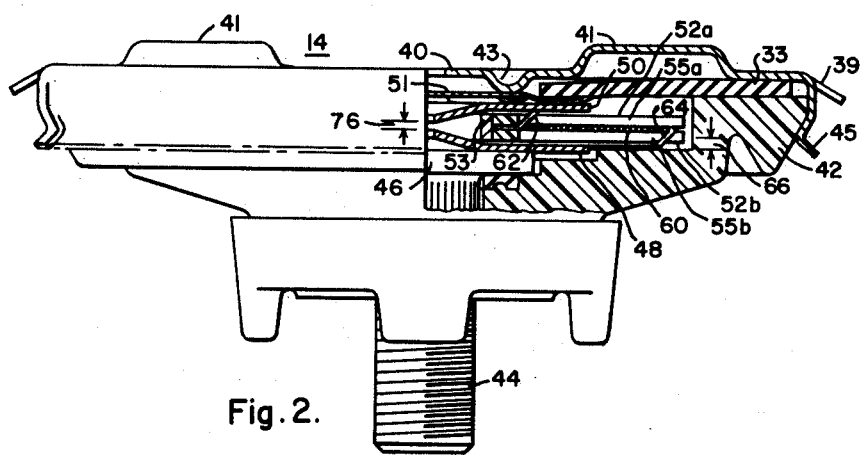
FIGURE 2 is a side elevational view illustrating the interrupter of this invention, partly in section.
Figure 3:
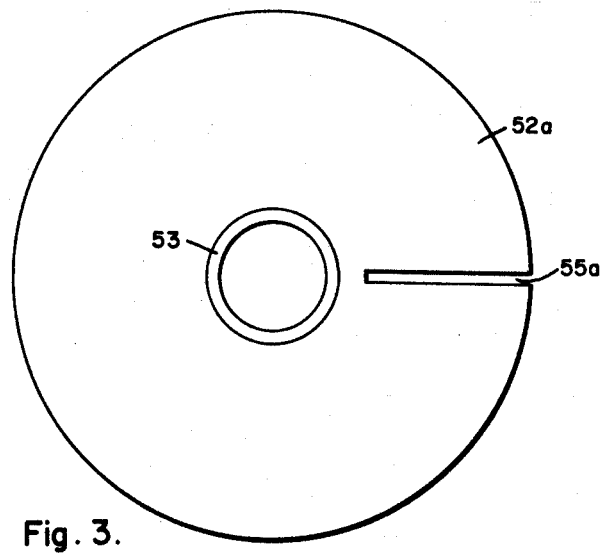
FIGURE 3 is a top elevational view of an insulating plate employed in this invention.

As seen more clearly in FIG. 2, the dropout assembly or circuit interrupter 14 has a cap or cover 40 which forms an enclosure for a housing 42. Although the housing shown is made of wood flour filled phenolic resin, any suitable dielectric material, as for example, porcelain may be employed. The cover or closure member 40 is of conducting material. It has a shaped surface which includes bulges 41 for engaging the conducting surface at the lower end of block 30. Indentations or depressions 43 are formed in the cap 40 to provide contacts with the upper gap electrode 50. The cover 40 has a plurality of circumferentially spaced downwardly extending spring fingers 45 for engaging the housing 42 and for securing the housing thereto. Other spring fingers 39 extend downwardly to engage the annular recess 37 in skirt 35 for securing the dropout device in the arrester housing. In order to seal the joint between the upper end of the arrester housing and the dropout device 14 a gasket 38 is disposed between the top peripheral edge of the dropout device and the shoulder 36. Annular recess 37 is filled with a resin and hardener as at 68 or any other suitable sealing compound. Resinous material 68 also serves to weather protect cover 40 and gasket 38. A gasket 33 is interposed between the cover 40 and the upper annular surface of the dropout housing 42. The compression spring 34 engages the lower end of the valve resistance block and the top side of the cover 40 intermediate bulges 41. A terminal stud 44 for connecting the dropout assembly to ground extends through the lower wall of the housing 42 and has a head portion 46 within the housing.

A pair of lower and upper gap electrodes 48 and 50, respectively are disposed within the housing. Lower electrode 48 engages the lower wall in contact with the head 46 and the upper electrode 50 engages a disc spring contact plate 51 intermediate electrode 50 and the closure member 40. Spark gap electrodes 48 and 50 are spaced apart by an annular spacer and coil retainer 52. The spacer 52 may be of fiber or any suitable material which evolves gas when subjected to overheating or an electric arc. The spacer 52 comprises a pair of upper and lower annular plates 52a and 52b, respectively. They are press fitted to central tubular post 53 of similar material to the plates 52. The plates 52a and 52b are spaced apart by a flat spirally wound coil 60 which may be of any suitable conducting material and is preferably small size wire. A lead 62 is brought out from the upper end of the coil to overlie the spacing disc or spacing member 52 through a radial slot 55a in plate 52a, and a lead 64 is brought out from the other end of the coil through a slot 55b in plate 52b and underlies the spacing member 52b. The spark gap electrodes 48 and 50 abut the spacing member 52 and are spaced thereby. The electrodes 48 and 50 thereby make contact with the coil through the leads 64 and 62, respectively.

The side walls of the circuit interrupter housing 42 have an annular reduced weakened portion intermediate the upper and lower ends as indicated by the arrows at 66.

At each end of the arrester there is threaded on the terminal stud a hand-wheel nut 70 to secure the line and ground leads to the terminal studs.

A circuit interrupter or dropout device has thus been provided which includes a flat spiral wound inductance coil 60 of fine wire, or other small electrical conductor, and a spark gap connected in parallel. The dropout device is disposed in series with an excess voltage protective device or lightning arrester connected between line and ground. The electrical conductor or wire is of such diameter that it is rapidly vaporizable when exposed to normal line frequency current for a predetermined length of time. When exposed to surge current, such as switching or lightning surges, the impedance of the coil 60 is such as to effect sparkover of the gap 76, so that upon occurrence of a surge the circuit interrupter passes the surge current to ground through the gap.

The vaporizable coil 60 is situated between the pair of insulating plates 52 which readily evolve gas when exposed to sufficiently high temperature or an arc, and upon passage of continued normal line frequency current, the coil is vaporized, with arcing and high temperatures which causes the fiber plates to evolve gas, thereby exerting force on the housing at the reduced or thin wall portion 66 and fracturing the wall to separate the bottom portion which includes the ground stud 44 of the device from the housing 42, disconnecting the ground terminal stud from the device. It should be noted that slots 55 in fiber plates 52a and 52b provide a gap for arcing between electrodes 48 and 50 upon vaporization of the coil 60. This arc passing through slots 55 causes additional evolution of gas creating more pressure and therefore more positive dropout action. These slots 55a and 55b are preferably slightly out of alignment but may, of course, be aligned. By rotating the slots slightly out of alignment increased burning or eroding of the fiber plates occurs. Thus, more gas is evolved than would be when the slots are aligned.

It will, of course, be understood that the coil may be designed, if desired, to cause the coil to vaporize at other frequencies or at predetermined values of current. Under surge conditions, the coil 60 offers high impedance to the surge currents since the steep wave front of a surge has the effect of a high frequency current. Therefore, sufficient voltage appears across the gap 76 to spark it over so that the surge current flows to ground through the gap. However, should the block 30 fail, the power follow current will not be interrupted, but will instead maintain an arc across and through the blocks 30. Once such an arc has been established, power follow current will change to the full unlimited fault current of the electrical system. In this case, the current is of normal line frequency and will flow through the coil 60. The coil being of small size wire will vaporize causing gas pressure to build up within the housing 42. This pressure, because of the radial path formed by the space between the plates 52 is applied directly toward the side wall of the circuit interrupter housing causing fracture of the housing at the reduced portion 66 of the side wall and consequent separation of the bottom portion to separate the terminal stud, thereby disconnecting the excess voltage protective device or lightning arrester from the line.

All of this transpires very rapidly as soon as full fault current flows, or even before.

It should now be apparent that a circuit interrupter for an excess voltage protective device or lightning arrester has been provided which has many advantages. The interrupter comprises few parts and is simple and economical to assemble. Because of the use of a flat spiral coil the length of the interrupter is substantially reduced. Use of this flat spiral coil enables the coil to be located in an annular radially directed slot between the fiber members 52 which also serves to space the gap electrodes to form the spark gap 76. Thus, the plates 52 perform a fourfold function; (1) that of retaining a coil; (2) spacing the gap electrodes; (3) serving as a gas evolving element and (4) serving as a gas directing baffle. Use of a flat spiral coil in a radial slot between the plates 52 provides a radial directing means for directing the gases directly toward the outer walls of the housing 42 thereby applying the hot gases to weaken the thin section 66 while the pressure is building up within the housing. The interrupter is simple and compact and has few parts, is of small physical size and results in positive separation or opening of the arrester circuit under fault conditions.

While a certain specific embodiment of the invention has been shown and described for the purpose of illustration, it will be apparent that various modifications and embodiments are possible within the scope of the invention.

I claim as my invention:

1. In a circuit interrupter adapted to be connected in series with an excess voltage protective device, said interrupter including a housing, means for conducting surge current through said interrupter, and impedance coil means connected across said surge current conducting means within said housing; said coil means comprising a flat, spirally wound coil, said coil being rapidly vaporizable when subject to normal line frequency current, said coil being positioned between a pair of plates capable of evolving gas when subjected to the heat of the coil when undergoing vaporization, whereby sufficient force is developed within said housing by the vapor from said coil and by said gas evolving plates to separate a terminal carrying portion of said housing.

2. In a circuit interrupter adapted to be connected in series with an excess voltage protective device, said interrupter including a housing having an external terminal stud at one end, gap means for conducting surge current through said interrupter, and impedance coil means connected across said gap means within said housing; an impedance coil and gap assembly comprising a flat spirally wound coil, said coil being rapidly vaporizable when subjected to normal line frequency current, said coil being positioned between a pair of annular plates capable of evolving gas when subjected to the heat of the coil when undergoing vaporization in a quantity effective to develop sufficient force together with the vapor from said coil to separate the terminal carrying portion from said housing, and a pair of gap electrodes disposed on each side of and spaced apart by said annular plates to form said gap means.

3. A circuit interrupter adapted to be connected in series with an excess voltage protective device, said interrupter including a housing having an external terminal stud at one end, gap means for conducting surge current through said interrupter, and impedance coil means connected across said gap means within said housing; said gap means and said coil means forming a coil and gap assembly comprising a flat spirally wound coil, said coil being rapidly vaporizable when subjected to normal line frequency current, but offering high impedance to surge current, said coil being positioned between a pair of annular plates capable of evolving gas when subject to the heat of the coil when undergoing vaporization, said housing having a weakened portion circumscribing its periphery in a plane parallel to said coil and the space between said plates.

4. A circuit interrupter adapted to be connected in series with an excess voltage protective device, said interrupter including a housing having an external terminal stud at one end, gap means for conducting surge current through said interrupter, and impedance coil means connected across said gap means within said housing; said gap means and said coil means forming a coil and gap assembly comprising a flat spirally wound coil, said coil being rapidly vaporizable when subjected to normal line frequency current, but offering high impedance to surge current, said coil being positioned between a pair of annular plates capable of evolving gas when subject to the heat of the coil when undergoing vaporization, said housing having a portion of reduced thickness on its side walls in a plane parallel to said coil and the space between said plates.

5. A circuit interrupter adapted to be connected in series with an excess voltage protective device, said interrupter including a housing having an external terminal stud at one end, gap means for conducting surge current through said interrupter, and impedance coil means connected across said gap means within said housing; said gap means and said coil means forming a coil and gap assembly comprising a flat spirally wound coil, said coil being rapidly vaporizable when subjected to normal line frequency current, but offering high impedance to surge current, said coil being positioned between a pair of annular plates capable of evolving gas when subject to free ends of said coil, one of said gap electrodes being housing having a weakened portion circumscribing its periphery in a plane parallel to said coil and the space between said plates, and a pair of gap electrodes disposed on each side of and spaced apart by said annular plates.

6. A circuit interrupter adapted to be connected in series with an excess voltage protective device, said interrupter including a housing having an external terminal stud at one end and a closure at the other end, said closure having means thereon for securing it to an excess voltage protective device, a pair of fiber spacer plates forming an annular radial slot opening outwardly in a direction away from the center, a pair of electrodes, said electrodes being positioned on opposite sides of said plates to form a spark gap, a flat, spiral coil wound in said slot between said plates and electrically connected across said gap, said coil offering high impedance to surge current and vaporizable when subjected to normal line frequency current, said fiber plates being capable of evolving gas when subjected to the heat of said coil during vaporization, and said housing having a reduced, weakened wall portion in the plane parallel to said annular slot.

7. A circuit interrupter adapted to be connected in series with an excess voltage protective device, said interrupter including a housing having an external terminal stud at one end and a closure at the other end, said closure having means thereon for securing it to an excess voltage protective device, a pair of spacer plates of gas evolving insulating material, each of said plates having a central opening and a radial slot extending from its periphery to a point spaced from the central opening, said plates being spaced apart by a flat spiral coil of conducting wire, said coil having each of its free ends extending outwardly through opposed radial slots, a pair of gap electrodes spaced apart forming a gap space through said central openings and said radial slots, each of said electrodes being in electrical contact with one of said free ends of said coil, one of said gap electrodes being in electrical contact with said cover and the other of said gap electrodes being in electrical contact with said terminal stud.

No references cited.